E. E. GREVE.
OIL BATH ROTARY SWIVEL.
APPLICATION FILED JUNE 1, 1917.
1,259,854.
Patented Mar. 19, 1918.
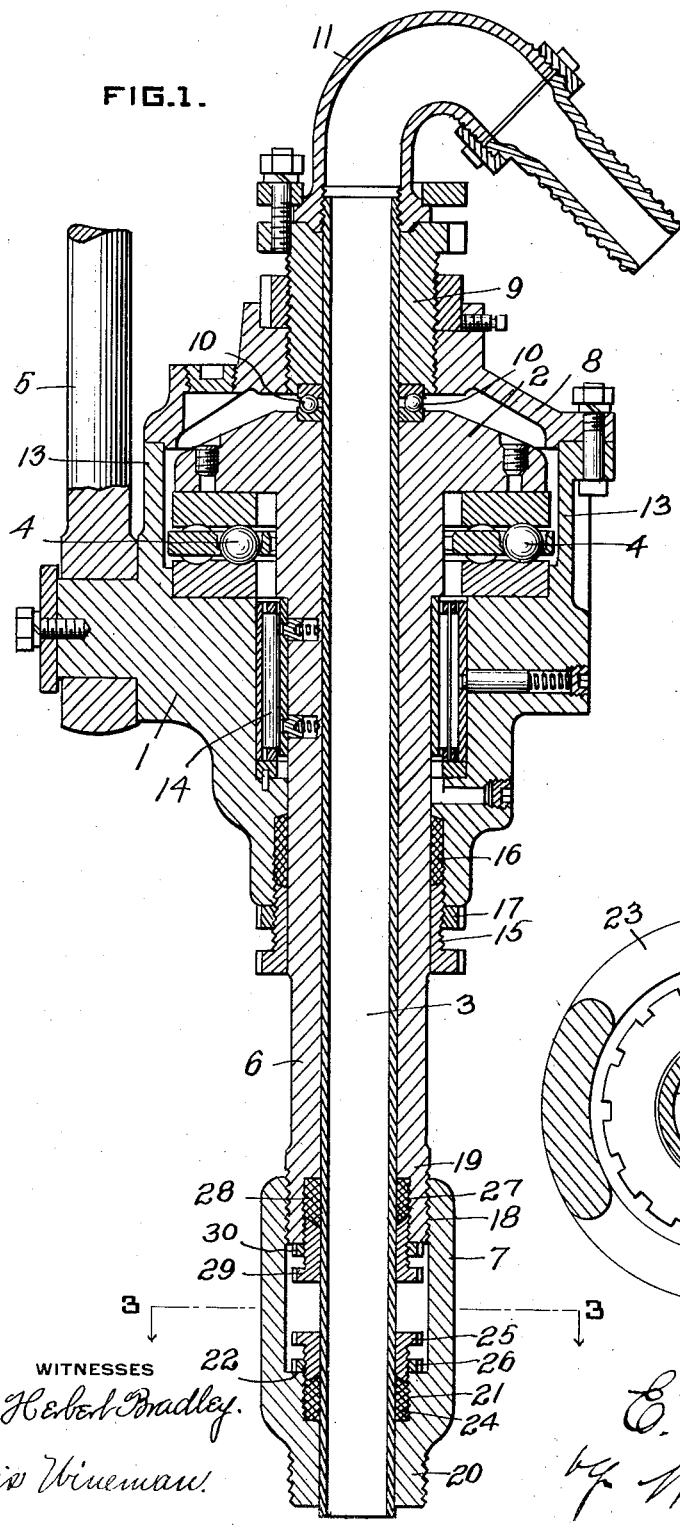
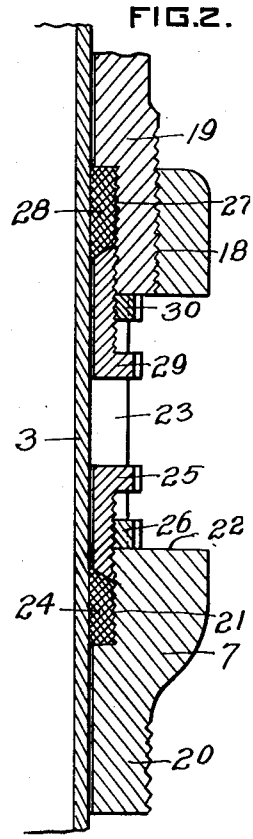
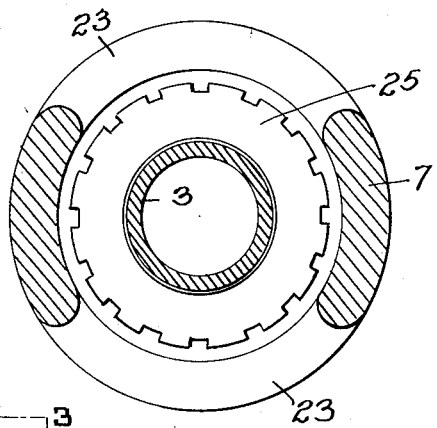
WITNESSES
J. Herbert Bradley.
Lois Wineman.
INVENTOR
E. E. Greve
by W. T. Doolittle
Attorney.

UNITED STATES PATENT OFFICE.

EDGAR E. GREVE, OF BELLEVUE, PENNSYLVANIA, ASSIGNOR TO OIL WELL SUPPLY COMPANY, OF PITTSBURGH, PENNSYLVANIA, A CORPORATION OF PENNSYLVANIA.

OIL-BATH ROTARY SWIVEL.

1,259,854.     Specification of Letters Patent.     Patented Mar. 19, 1918.

Application filed June 1, 1917. Serial No. 172,199.

*To all whom it may concern:*

Be it known that I, EDGAR E. GREVE, a citizen of the United States, residing at Bellevue, in the county of Allegheny and State of Pennsylvania, have invented certain new and useful Improvements in Oil-Bath Rotary Swivels, of which the following is a specification.

My invention relates to improvements in oil bath rotary swivels for well drilling apparatus of the class shown and described in a companion application for patent filed February 24, 1917, Serial Number 150,693.

The prime object of the present invention is to provide efficient means at the lower end of the swivel to prevent water working into the interior of the swivel and oil from leaking or passing into the water employed in the operation of drilling.

A further object of the invention is to provide a construction having the above mentioned means so positioned relatively to the swivel that they are readily accessible for manipulation when it is desired to change or adjust the packing glands constituting a portion of the oil and water leakage preventing means.

A still further object of the present invention is to provide a new and improved coupling device designed to constitute a portion of the means for preventing leakage of oil and water, and of such a construction as to permit access to be had to the packing glands.

In the accompanying drawing which illustrates an application of my invention,

Figure 1 is a vertical sectional view of my improved swivel, one-half of the view being taken on a plane at right angles to the other half;

Fig. 2 is an enlarged detail vertical sectional view showing the lower end of the swivel, coupling member and means for preventing leaking of oil and water; and Fig. 3 is an enlarged horizontal sectional view taken on line 3—3 of Fig. 1.

Referring to the drawing, 1 is the body of the swivel, consisting of an annular casing surrounding the swivel head 2, water pipe 3, and bearings 4. Said body is adapted to be pivotally suspended by a bail 5 from a hoisting block, not shown, and within which body the head and pipe are adapted to rotate in the relative swiveling action of the parts.

The head 2, as illustrated and preferred, is provided with an elongated cylindrical stem 6 inclosing the water pipe almost to the lower end of the latter, and is adapted to engage a coupling member 7, to the lower end of which the drill pipe is attached. A swivel cap 8 covers the head and is rigidly secured to the body by bolts. Threaded into the central bore of this cap is an adjusting bushing 9 surrounding the water pipe and movable longitudinally thereof for taking up wear on bearings 10.

11 designates a goose-neck which is threaded to the upper end of the water pipe 3. Mounted between the body 1 and the head 2 are the main roller bearings 4 which support the swivel head, which latter in turn carries the load of the drill pipe. These bearings are surrounded at their inner periphery by the annular wall of the cylindrical stem 6, and at their outer periphery by an annular flange 13 extending upwardly from the body 1, said flange being clamped against the protecting or swivel cap 8. By means of this arrangement, it will be seen that the bearings are entirely inclosed and that the construction provides a space for the reception of oil in which said bearings 4 and 10 are located.

Mounted between the body and the cylindrical stem of the head, below the main bearings 4, are vertical roller bearings 14 adapted to take the side thrust of the head. Between the stem and the lower annular portion of the body is mounted a gland 15 threaded into the body and adapted, in conjunction with suitable packing 16, to retain the lubricating oil in the body. 17 designates a lock nut for this gland.

The above construction is more fully described in my companion application heretofore referred to, and as it forms no part of the present invention, it is deemed unnecessary to further describe this construction herein.

As it is well known, in swivels of the class of this invention, it is necessary to provide a slight clearance between the rotating swivel-stem and the fluid tube inclosed thereby, and that means must be provided for preventing the leakage of oil from between the swivel-stem and tube into the water being pumped into the well, also to prevent the passage of water, mud or other substances from the lower end of the swivel to the interior of the same.

These means constitute a characteristic and important feature of the present invention and as illustrated, they include in addition to the coupling member 7, two separated packing boxes, one formed between the lower end of the swivel-stem and the fluid tube and the other between the coupling member and said tube, and adjustable glands coöperating with the packing of said boxes.

Coupling member 7 is preferably formed with upper internal threads 18 designed to receive the lower threaded end 19 of the swivel-stem and with a lower externally threaded end 20, the latter being designed to engage a section of drill pipe not shown. In addition to the threaded portions described, coupling member 7 is provided with an annular threaded recess 21 and an annular ledge or shoulder 22 and with oppositely disposed openings 23.

Annular recess 21 is adapted to receive packing 24 and a portion of an adjustable threaded gland 25, the packing 24 being held in position between the tube and the coupling member is designed to prevent the passage of water, mud, etc., upwardly between the tube and coupling. Any water, etc., that may pass this packing, however, will pass out through the openings 23 of the coupling member, thus making it impossible for water, etc., to reach the interior of the swivel. 26 designates a lock-nut coöperating with the gland 25 and shoulder 22 to maintain the gland in the desired position. The gland and lock-nut are accessible for manipulation by a suitable tool entered in the openings 23 of the coupling member.

As above stated, a second packing box is employed and this box is formed by an annular threaded recess 27 located at the lower end of the swivel-stem. Recess 27 is adapted to contain a packing 28 and to receive a threaded gland 29. Gland 29 as well as a lock-nut 30 coöperating therewith, are accessible through the openings 23 of the coupling.

What I claim is:—

1. The combination with a rotary swivel comprising a fluid-tube and a swivel-stem encircling the tube, of a hollow coupling-member having openings in the wall thereof, packing recesses formed respectively in the stem and coupling-member, packing in said recesses, and glands for the recesses, the glands being accessible through the openings in the coupling-member whereby the packings and glands may be manipulated without disconnecting the coupling from the swivel or drill pipe.

2. The combination with a rotary swivel comprising a fluid-tube and a swivel-stem encircling the tube, of a hollow coupling-member therefor, threaded packing recesses formed respectively in the stem and coupling-member, packing in said recesses, a threaded gland entered in each of the recesses and a lock nut on each gland adapted to respectively engage the lower end of the stem and a shoulder on the coupling.

3. The combination with a rotary swivel comprising a fluid-tube and a swivel-stem encircling the tube, of a hollow coupling-member having openings in the wall thereof, threaded packing recesses formed respectively in the stem and coupling member, and a threaded gland entered in each recess, the glands being accessible through the openings in the coupling-member whereby the packings and glands may be manipulated without disconnecting the coupling from the swivel or drill pipe.

4. The combination with a rotary swivel comprising a fluid-tube and a swivel-stem encircling the tube, of a hollow coupling-member secured to the lower end of the stem, said tube projecting down through the coupling-member, packing recesses formed respectively in the stem and coupling-member, packing in said recesses between the tube and stem and between the tube and coupling-member, glands operating in said recesses, lock nuts coöperating with the glands and with the stem and coupling respectively, said coupling-member having openings to afford access to the glands whereby the packings and glands may be manipulated without disconnecting the coupling from the swivel or drill pipe.

In testimony whereof I affix my signature in presence of two witnesses.

EDGAR E. GREVE.

Witnesses:
J. M. GEOGHEGAN,
LOIS WINEMAN.